June 7, 1949.                    H. S. ROBINSON                    2,472,126
                                MICROMETER CALIPER
                                Filed July 30, 1945

Inventor
Hugh S. Robinson
By Ralph L. Chappell
Attorney

Patented June 7, 1949

2,472,126

UNITED STATES PATENT OFFICE 2,472,126

MICROMETER CALIPER

Hugh S. Robinson, United States Navy

Application July 30, 1945, Serial No. 607,896

1 Claim. (Cl. 33—164)

(Granted under the act of March 3, 1883, as amended April 30, 1928; 370 O. G. 757)

The present invention relates to new and useful improvements in measuring instruments, and more particularly to such improvements in micrometer gages.

An object of the present invention is to provide for increased accuracy of measurement in the use of micrometer gages or similar instruments.

A further object of the invention is to accomplish the aforesaid accurate measurement by assuring the influence of uniform pressures by the calibrating parts on the work to be measured.

A still further object of the invention is to provide a measuring instrument of the above type having a fluid column adapted to be brought to a predetermined position corresponding to the position of the fluid column at zero reading on the measuring scale, whereby to assure the subsequent exertion of uniform pressures on the work when measured.

The invention still further aims to provide a measuring instrument of the above type which is relatively simple in construction and easily operated with assured accuracy of results.

The above and other objects of the invention will in part be obvious and will be hereinafter more fully pointed out.

Figure 1:
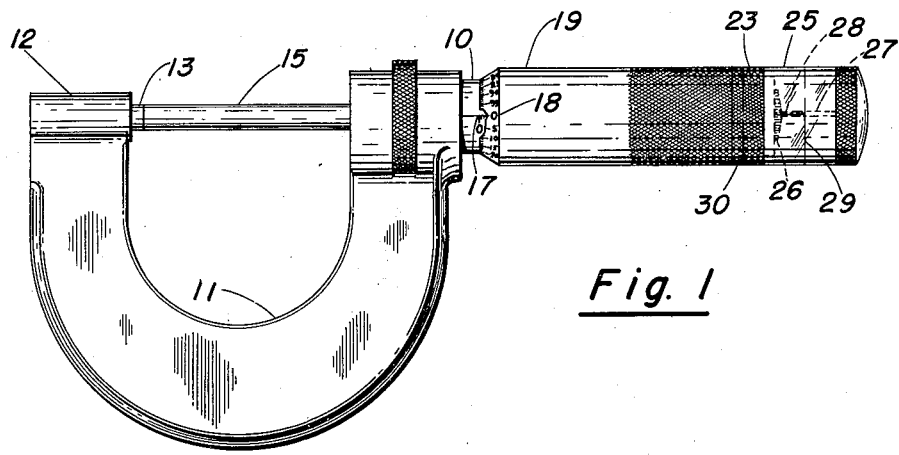
Figure 2:
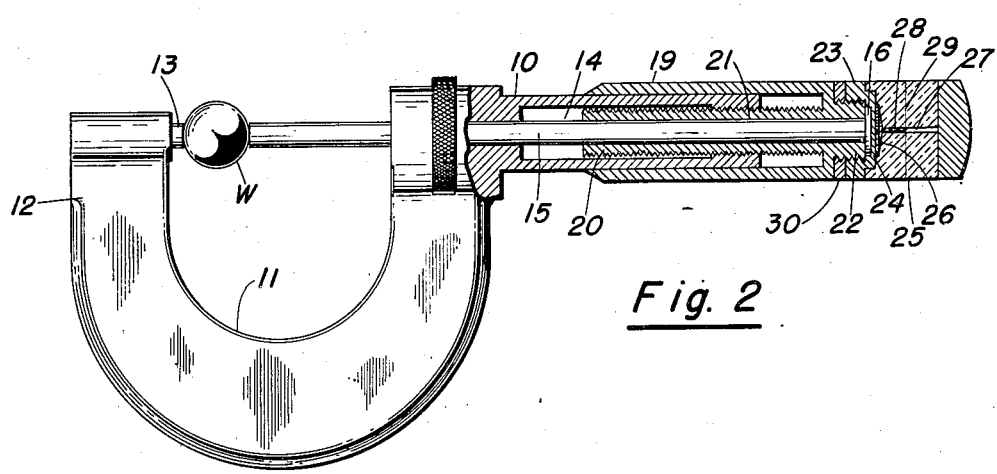

In the accompanying drawings:

Fig. 1 is an elevation showing the position of the calibrated parts and the fluid column at zero reading on the measuring scale; and Fig. 2 is a longitudinal section of Fig. 1, but showing the position of the scale reading and fluid column during measurement of a work piece.

Referring more in detail to the accompanying drawings, the invention is illustrated as including a stationary cylindrical frame portion 10 which is provided at one end thereof with an extension 11 including an inwardly extending portion 12 having an anvil 13 against which or on which the work is positioned during measuring. The frame portion 10 is provided with an axial passage 14 within which is disposed a plunger or spindle 15 having at the inner end thereof a mushroom head 16. The frame portion is also provided with conventional scale markings 17 which extend longitudinally thereof and which are adapted to cooperate with circumferential scale markings 18 around the free end of the skirt portion of a cylindrical thimble 19 which overlies and extends around the adjacent portion of the frame 10. The thimble 19 is also provided with a centrally located extension 20 spaced inwardly of the skirt portion and which is externally threaded to engage cooperating threads on the frame portion 10. The extension 20 is provided with an axial bore 21 to accommodate the spindle 15 which extends therethrough.

At the outer end of the thimble 19, there is provided a central outward extension 22 which is externally threaded to engage cooperating threads on a nut member 23. The mushroom head 16 on the spindle 15 is disposed in contact with the outer edge of the extension 22. The nut member 23 is closed at the outer end thereof by a wall portion 24 overlying and engaging the mushroom head 16 and affording a limited amount of flexibility to substantially provide a diaphragm arrangement. A cap member 25 is secured in any conventional manner to the nut member 23 in fluid tight relationship and is provided with a recess 26 which communicates with a closed capillary passage 27. The cap member 25 may be made of transparent material to permit the operator to see the passage 27. A suitable fluid 28 is disposed in the recess 26 and may be forced into the passage 27 upon slight outward movement of the diaphragm portion 24 of the nut member 23 under influence of the piston head 16.

For the purpose of effecting accurate measurement of any size work piece, the cap member 25 is rotated and with it, the thimble 19 so as to force the spindle 15 toward the anvil 13. When the outer end of the spindle 15 touches the anvil 13 and the reading of the scales 17, 18 is zero, as indicated in Fig. 1, there will be slight pressure on the diaphragm 24 so that the fluid 28 will be forced into the passage 27. At the zero setting of the scale markings 17, 18, the nut member 23 is adjusted so that the head 16 of the spindle 15 exerts sufficient pressure on the diaphragm 24 to force the fluid 28 into the passage 27 to register with the circumferential marking 29 therearound. A lock nut 30 is employed to securely maintain the nut member 23 in its adjusted position which may be varied to require different pressures to be exerted on the spindle, if desired. Then, when it is desired to measure a work piece W, reference being had to Fig. 2, the work piece is placed between the anvil 13 and the adjacent end of the spindle 15 and the cap member 25 manipulated until the end of the spindle touches the work piece. In order to obtain uniformly accurate measurement, the cap member is turned until the pressure exerted by the spindle on the diaphragm will cause the fluid to reach the same point 29 as it did at the zero setting; thus assuring uniform pressure on the work to be measured. In this manner, any operator can manipulate the instrument without regard to individual variations in the application of pressure to the spindle, because the level of the fluid in the passage 27, if brought to the pre-set marking 29, will assure that the same and uniform pressures are being applied during measurement of the work.

While one form of the invention has been shown for purposes of illustration, it is to be clearly understood that various changes in the details of construction and arrangement of parts may be made without departing from the scope of the invention as set forth in the appended claim.

The invention described herein may be manufactured and used by or for the Government of the United States of America for governmental purposes without the payment of any royalties thereon or therefor.

What I claim is:

A measuring instrument comprising a U-shaped frame member, an anvil secured to one end of said frame member, an internally threaded hollow shank secured to the other end of said frame member, a plunger supported in said shank and slideable relative to said frame for effecting desired measurement, a retaining head on one end of said plunger, a rotatable thimble threadedly engaging said shank and having a threaded head whose end face forms a seat for said retaining head, a nut adjustably secured to said thimble head for retaining said plunger head against said face and having a flexible end portion forming a diaphragm, and a transparent calibrated extension secured to said nut containing a liquid chamber filled with a liquid adjacent said diaphragm and provided with a bore through which the liquid in said chamber will be forced to an indicated level whenever predetermined pressure is exerted between said plunger and said anvil upon rotation of said thimble.

HUGH S. ROBINSON.

REFERENCES CITED

The following references are of record in the file of this patent:

UNITED STATES PATENTS

| Number | Name | Date |
|---|---|---|
| 1,623,574 | Bryant | Apr. 5, 1927 |
| 2,378,093 | Monies | June 12, 1945 |